United States Patent
Nakagawa

(10) Patent No.: US 11,550,274 B2
(45) Date of Patent: Jan. 10, 2023

(54) INFORMATION PROCESSING APPARATUS AND INFORMATION PROCESSING METHOD

(71) Applicant: Kabushiki Kaisha Toshiba, Tokyo (JP)

(72) Inventor: Hideyuki Nakagawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 30 days.

(21) Appl. No.: 17/009,935

(22) Filed: Sep. 2, 2020

(65) Prior Publication Data

US 2021/0294281 A1    Sep. 23, 2021

(30) Foreign Application Priority Data

Mar. 19, 2020    (JP) .............................. JP2020-049231

(51) Int. Cl.
| | |
|---|---|
| G05B 13/04 | (2006.01) |
| G05B 23/02 | (2006.01) |
| G11B 5/596 | (2006.01) |
| G11B 5/55 | (2006.01) |
| G05B 17/02 | (2006.01) |

(52) U.S. Cl.
CPC ........... *G05B 13/048* (2013.01); *G05B 17/02* (2013.01); *G05B 23/0254* (2013.01); *G11B 5/5582* (2013.01); *G11B 5/59627* (2013.01)

(58) Field of Classification Search
CPC .. G05B 13/048; G05B 17/02; G05B 23/0254; G05B 13/024; G11B 5/5582; G11B 5/59627
See application file for complete search history.

(56) References Cited

U.S. PATENT DOCUMENTS 9,691,420 B2    6/2017    Matsuzawa
2019/0295827 A1*  9/2019    Ohmori .............. G05B 19/4155

\* cited by examiner

*Primary Examiner* — Chad G Erdman
(74) *Attorney, Agent, or Firm* — Oblon, McClelland, Maier & Neustadt, L.L.P.

(57) ABSTRACT

An information processing apparatus includes an n-th parameter adjuster and an (n+1)-th parameter adjuster. The n-th parameter adjuster adjusts an n-th parameter set so that an n-th evaluation value set based on the n-th parameter set approaches an n-th target value set. The (n+1)-th parameter adjuster adjusts an (n+1)-th parameter set so that an (n+1)-th evaluation value set based on the (n+1)-th parameter set approaches an (n+1)-th target value set. In addition, the n-th parameter adjuster acquires, based on initial value set or search value set of the n-th parameter set, an n-th actual measured value set or an n-th predicted value set, acquires an (n+1)-th target value set based on the initial value set or the search value set of the n-th parameter set, and searches for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set.

11 Claims, 6 Drawing Sheets

PARAMETER ADJUSTMENT OF n-TH STAGE

PARAMETER ADJUSTMENT OF (n+1)-TH STAGE

PARAMETER ADJUSTMENT OF n-TH STAGE

PARAMETER ADJUSTMENT OF (n+1)-TH STAGE

INFORMATION PROCESSING APPARATUS AND INFORMATION PROCESSING METHOD

BACKGROUND

Technical Field

Embodiments of the present invention generally relate to an information processing apparatus and an information processing method.

Related Art

Servo control systems are in general complicated in accordance with implementation of high performance of a control target. For this reason, the number of control parameters to be adjusted has increased. In related art, a designer adjusts many control parameters in a stepped manner on the basis of knowledge and experience while performing a simulation thereof. For this reason, in the related art, it will take a time for adjustment, or become difficult to perform adjustment in accordance with complication of control targets in the future, and the like. These are not only limited to a servo control system but also to other control systems.

PATENT DOCUMENTS

[Patent Document 1] U.S. Pat. No. 9,691,420

SUMMARY

In some embodiments of the present invention, an information processing apparatus and an information processing method are to automatically optimize parameters, which require time for adjustment or are difficult to adjust for a person, using machine learning.

According to some embodiments, an information processing apparatus may include, but is not limited to, an n-th parameter adjuster and an (n+1)-th parameter adjuster. The n-th parameter adjuster adjusts an n-th parameter set so that an n-th evaluation value set based on at least the n-th parameter set among a plurality of parameters dependent from each other approaches an n-th target value set. The (n+1)-th parameter adjuster adjusts an (n+1)-th parameter set so that an (n+1)-th evaluation value set based on at least the (n+1)-th parameter set among the plurality of parameters approaches an (n+1)-th target value set. In addition, the n-th parameter adjuster, in a case that the number of times of searching for the n-th parameter set is equal to or smaller than a predetermined number, acquires at least one or more sets of initial values of the n-th parameter set, acquires, based on each of the acquired one or more sets of initial values, an n-th actual measured value set or an n-th predicted value set, acquires the (n+1)-th target value set based on each set of the acquired one or more sets of initial values, and searches for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set and, in a case that the number of times of searching for the n-th parameter set exceeds the predetermined number, acquires, based on the searched n-th parameter set, an n-th actual measured value set or an n-th predicted value set, acquires the (n+1)-th target value set based on the searched n-th parameter set, and searches for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set.

DETAILED DESCRIPTION

Hereinafter, an information processing apparatus and an information processing method according to an embodiment will be described with reference to the drawings. The information processing apparatus according to the embodiment is an apparatus that automatically adjusts or optimizes parameters, which are to be considered when a certain control system is designed, using machine learning. The control system, for example, is a servo control system. The servo control system is a system that feedback-controls an actuator such as a motor as in a hard disk drive (HDD). A control system that is a target for adjusting parameters is not limited to a servo control system and may be a wide variety of systems such as a control system of a robot arm and the like.

Hereinafter, an information processing apparatus 100 according to an embodiment will be described. The information processing apparatus 100 according to the embodiment may be a single apparatus or a system in which a plurality of apparatuses connected through a network NW operate in cooperation. For example, the network NW may include a wide area network (WAN), a local area network (LAN), and the like. In other words, the information processing apparatus 100 may be implemented by a plurality of computers (processors) included in a system using distributed computing or cloud computing.

[Configuration of Information Processing Apparatus]

Figure 1:
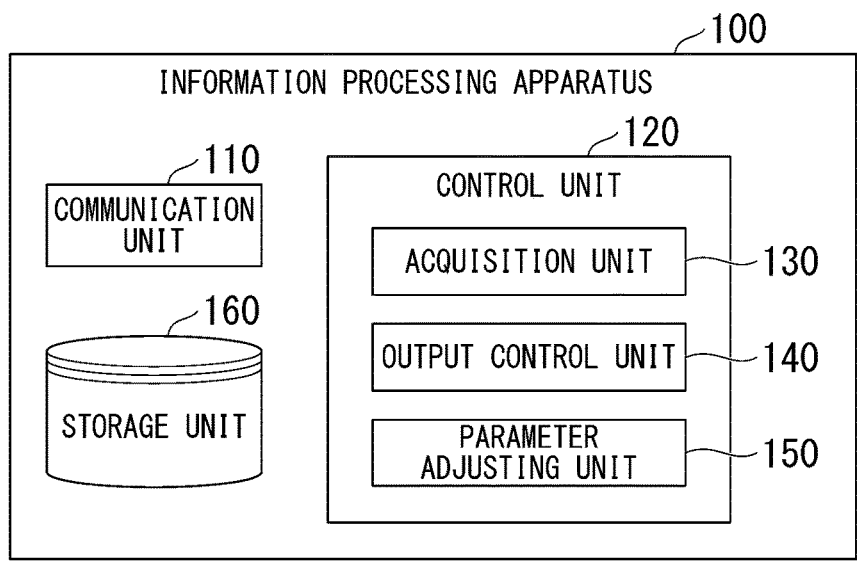
FIG. 1 is a diagram illustrating an example of the configuration of an information processing apparatus according to an embodiment.

FIG. 1 is a diagram illustrating an example of the configuration of the information processing apparatus 100 according to an embodiment. The information processing apparatus 100 according to the embodiment, for example, includes a communication unit 110, a control unit 120, and a storage unit 160.

The communication unit 110, for example, includes a communication interface such as a network interface card (NIC), a direct memory access (DMA) controller, and the like. The communication unit 110 communicates with an external device through a network NW. The external device, for example, is a computer that can be used by a designer of a control system and the like.

The control unit 120, for example, includes an acquisition unit 130, an output control unit 140, and a parameter adjusting unit 150. Such constituent elements, for example, are realized by a processor such as a central processing unit (CPU), a graphics processing unit (GPU), or the like executing a program stored in the storage unit 160. In addition, some or all of the constituent elements of the control unit 120 may be realized by hardware such as a large scale integration (LSI), an application specific integrated circuit (ASIC), a field-programmable gate array (FPGA), or the like or may be realized by software and hardware in cooperation.

The storage unit 160, for example, is realized by an HDD, a flash memory, an electrically erasable programmable read only memory (EEPROM), a read only memory (ROM), a random access memory (RAM), or the like. In the storage unit 160, operation results and process results according to the control unit 120 are stored in addition to various programs such as firmware, an application program, and the like.

The acquisition unit 130 acquires various kinds of information from a computer that can be used by a designer or the like through the communication unit 110. For example, the acquisition unit 130 may acquire an evaluation value set that has been actually measured by an experiment or the like by the designer or a target value set or acquire an evaluation value set predicted through a simulation.

The output control unit 140 outputs a result of adjustment of a set of parameters performed by the parameter adjusting unit 150 to be described later to a computer or the like that can be used by a designer through the communication unit 110

The parameter adjusting unit 150 adjusts (determines) a plurality of parameters to be considered at the time of designing a control system using machine learning. The plurality of parameters are under a dependency relation. For example, the adjustment of an n-th parameter set among the plurality of parameters depends on an (n−1)-th parameter set, and the adjustment of an (n+1)-th parameter set depends on the n-th parameter set. Here, "n" is an arbitrary natural number. Such a dependency relation is formed as in a case that the n-th parameter set is adjusted with a result of the adjustment of the (n−1)-th parameter set, and, similarly, the (n+1)-th parameter set is adjusted with a result of the adjustment of the n-th parameter set.

Figure 2:
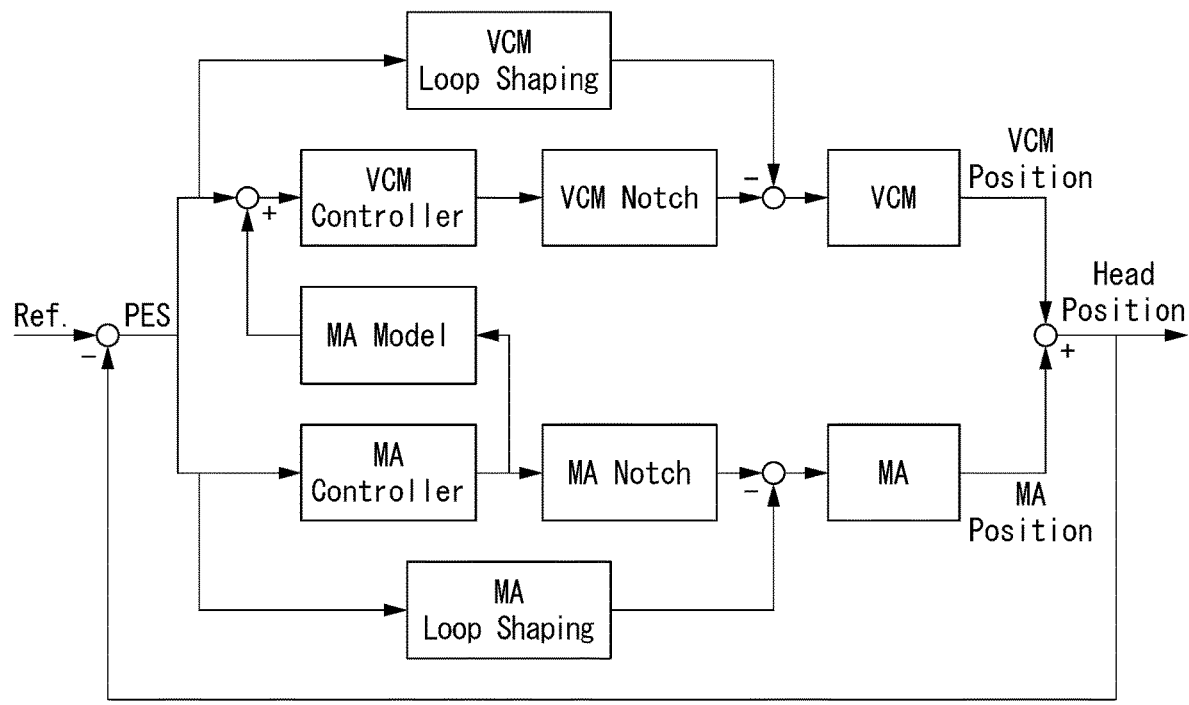
FIG. 2 is a diagram illustrating an example of a servo control system of an HDD.

FIG. 2 is a diagram illustrating an example of a servo control system of an HDD. As illustrated in the drawing, the servo control system of the HDD is composed of a plurality of filters. In the case of such a filter configuration, parameters of each filter have a dependency relation. For example, the n-th parameter set is a set of parameters relating to a filter (for example, a VCM loop shaping filter in the drawing) used for suppressing an external disturbance having an influence on a voice coil motor (VCM) side, and the (n+1)-th parameter set is a set of parameters relating to a filter (for example, an MA loop shaping filter in the drawing) used for suppressing an external disturbance having an influence on a micro actuator (MA) side. An external disturbance of the VCM side is an example of "a first external disturbance", and an external disturbance of the MA side is an example of "a second external disturbance. The filter used for suppressing an external disturbance of the VCM side is an example of "a first filter", and the filter used for suppressing an external disturbance of the MA side is an example of "a second filter".

A VCM is an actuator that is used for driving a suspension arm used for supporting a magnetic head of the HDD. Similar to the VCM, the MA is an actuator that drives the suspension arm and can perform positioning of the suspension arm more finely than the VCM. For example, in a case that an external disturbance is regarded as a non-repeatable-runout (NRRO), each filter may be an NRRO-suppression filter. In parameters of the NRRO-suppression filter, for example, a bandwidth, a depth, a center frequency, a Q value, and the like are included. An external disturbance is not limited to the NRRO and may be a repeatable-runout (RRO) or an external disturbance of any other type. In such a case, the filter may be appropriately changed in accordance with the type of external disturbance.

Generally, in the adjustment of a filter for the VCM and a filter for the MA, there are sequences or steps. For example, a designer adjusts a set of parameters so that an evaluation value set of one filter approaches a predetermined target value set and then adjusts a set of parameters so that another evaluation value set of the other filter approaches a predetermined target value set with the set of parameters of the one filter, which have been adjusted. For this reason, the set of parameters of the filter for the VCM and the other set of parameters of the filter for the MA have a uni-directionally or bi-directionally dependent relation.

Such an adjustment method is a method on a premise that, as the parameters are adjusted so that the evaluation value set of one filter to approach a predetermined target value set, an ideal target value set for the evaluation value set of the other filter can be acquired, and, consequently, the other set of parameters of the other filter can be adjusted toward the ideal target value set. However, there are cases in which, even when the evaluation value set slightly deviates from a predetermined target value set (does not come close to the target value set) by adjustment of the parameter set of one filter, a better target value set of the other filter can be acquired. Consequently, there are cases in which the filter performance can be improved more than that of the related art by adjusting the parameters so that the evaluation value set of the other filter approaches a better target value set. It is difficult for a person to adjust a set of parameters that is not on the premise.

Thus, the parameter adjusting unit 150 adjusts a plurality of parameters to be in a dependency relation through sequential or stepwise adjustment using machine learning.

[Configuration of Parameter Adjusting Unit]

Figure 3:
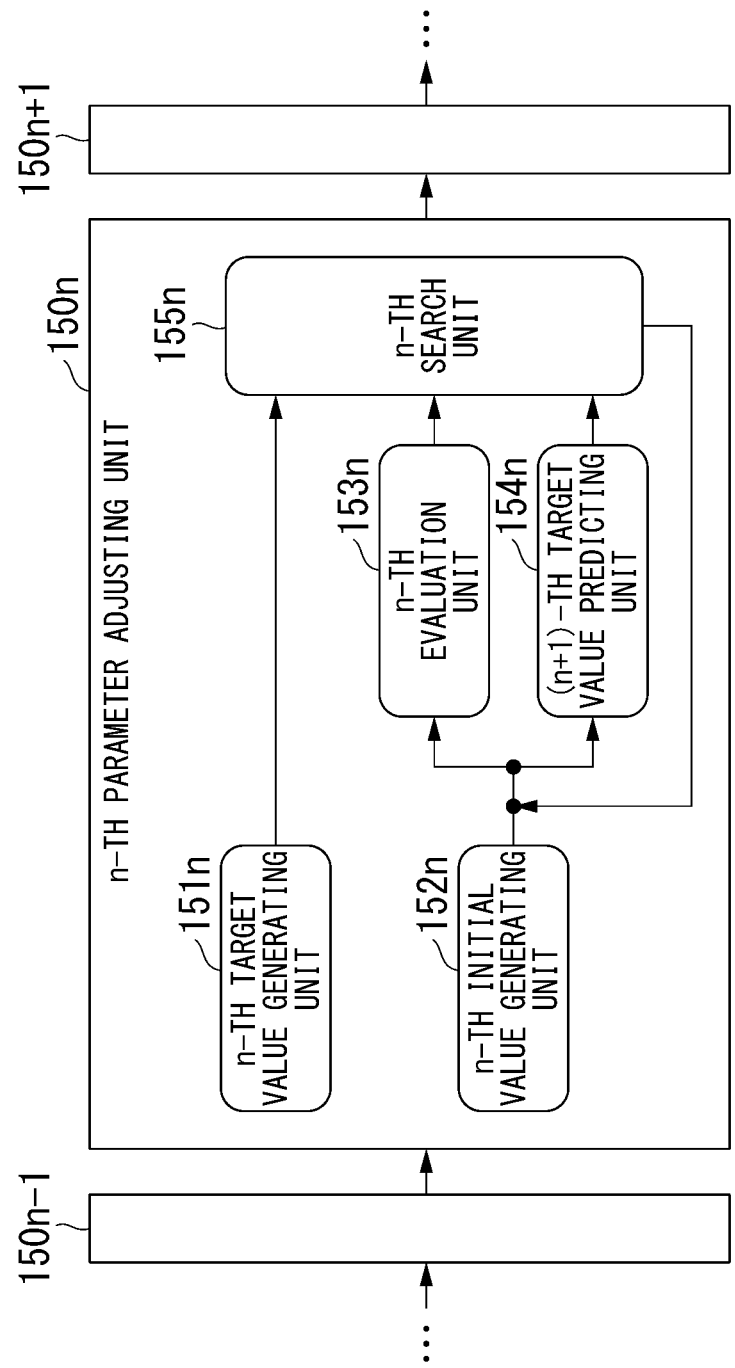
FIG. 3 is a diagram illustrating an example of the configuration of a parameter adjusting unit according to an embodiment.

Hereinafter, a detailed configuration of the parameter adjusting unit 150 will be described. FIG. 3 is a diagram illustrating an example of the configuration of the parameter adjusting unit 150 according to the embodiment. In a case that parameters to adjust are adjusted through a plurality of stages, the parameter adjusting unit 150 according to the embodiment includes a plurality of parameter adjusting units. For example, in a case that parameters that are adjustment targets are adjusted in three stages, as illustrated in the drawing, the parameter adjusting unit 150 may include an (n−1)-th parameter adjusting unit 150n−1, an n-th parameter adjusting unit 150n, and an (n+1)-th parameter adjusting unit 150n+1.

Parameters that are respectively adjusted by a plurality of these parameter adjusting units are different. For example, the (n−1)-th parameter adjusting unit 150n−1 adjusts an (n−1)-th parameter set, the n-th parameter adjusting unit 150n adjusts an n-th parameter set, and the (n+1)-th parameter adjusting unit 150n+1 adjusts the (n+1)-th parameter set.

After the (n−1)-th parameter set is adjusted by the (n−1)-th parameter adjusting unit 150n−1, the n-th parameter adjusting unit 150n adjusts the n-th parameter set using at least the (n−1)-th parameter set that has been adjusted. Then, after the n-th parameter set is adjusted by the n-th parameter adjusting unit 150n, the (n+1)-th parameter adjusting unit 150n+1 adjusts the (n+1)-th parameter set using at least the n-th parameter set that has been adjusted. In this way, the parameter adjusting units sequentially adjust the parameters. A parameter set adjusted by each parameter adjusting unit may have a one-dimensional value (scalar) or a multi-dimensional value (vector).

Hereinafter, descriptions will focus on the n-th parameter adjusting unit 150n among the plurality of parameter adjusting units. The n-th parameter adjusting unit 150n includes an n-th target value generating unit 151n, an n-th initial value generating unit 152n, an n-th evaluation unit 153n, an (n+1)-th target value predicting unit 154n, and an n-th search unit 155n. The other parameter adjusting units such as the (n−1)-th parameter adjusting unit 150n−1 and the (n+1)-th parameter adjusting unit 150n+1 also include units that are equivalent to the units of n-th parameter adjusting unit 150n.

The n-th target value generating unit 151n generates (determines) a target value set at the time of adjusting the n-th parameter set (hereinafter referred to as an n-th target value set). The n-th target value set may be one value or a plurality of values (sample values of a function). For example, in the servo control system illustrated in FIG. 2, in a case that the n-th parameter set is set as a set of one or more parameters relating to the filter for the VCM, a sample value representing a certain frequency characteristic relating to the filter for the VCM may be included as a target value.

For example, the n-th target value generating unit 151n generates an n-th target value set on the basis of at least the (n−1)-th parameter set that has been adjusted by the (n−1)-th parameter adjusting unit 150n−1 of the previous stage. More specifically, the n-th target value generating unit 151n acquires an (n−1)-th parameter set that has been adjusted from the (n−1)-th parameter adjusting unit 150n−1 of the previous stage and acquires an n-th target value set by an experiment or a simulation under a specific condition that uses the acquired (n−1)-th parameter set.

"At least" described here, for example, means that the n-th target value set may be further generated on the basis of an (n−2)-th parameter set that has been adjusted by an (n−2)-th parameter adjusting unit 150n−2 of a stage before two stages, an (n−3)-th parameter set that has been adjusted by an (n−3)-th parameter adjusting unit 150n−3 of a stage before three stages, and the like in addition to the (n−1)-th parameter set that has been adjusted by the (n−1)-th parameter adjusting unit 150n−1 of the previous stage.

In addition, in a case that the n-th parameter adjusting unit 150n is a parameter adjusting unit of the first stage, there is no another parameter adjusting unit in the previous stage, and an n-th target value set cannot be acquired by an experiment or a simulation under specific conditions, the n-th parameter adjusting unit 150n may use an n-th target value set determined in advance instead of generating the n-th target value set. For example, it is assumed that a designer appropriately determines an n-th target value set on the basis of a result of past experiments, simulations, and the like. In this case, the designer transmits the determined n-th target value set to the information processing apparatus 100 using a computer. Then, the communication unit 110 of the information processing apparatus 100 receives the n-th target value set from the computer of the designer through a network NW and stores the received n-th target value set in the storage unit 160. In this way, in a case that the n-th target value set is stored in the storage unit 160 in advance, the n-th target value generating unit 151n may read the n-th target value set from the storage unit 160 instead of generating an n-th target value set.

The n-th initial value generating unit 152n generates a set of parameter values (hereinafter, referred to as an n-th initial value set) that is used as an initial value set when the n-th parameter set is adjusted. For example, the n-th initial value generating unit 152n may randomly generates the n-th initial value set using a random number set. In addition, the n-th initial value generating unit 152n may generate a plurality of n-th initial values using a random number set. In addition, the n-th initial value generating unit 152n may generate a plurality of n-th initial values using a random number set and select an initial value set having an n-th evaluation value set that is closest to the n-th target value set generated by the n-th target value generating unit 151n among n-th evaluation values based on the plurality of n-th initial values.

In a case that search of a first time is performed, the n-th evaluation unit 153n acquires an n-th evaluation value set that has been actually measured by a designer or the like using the n-th initial value set generated by the n-th initial value generating unit 152n or acquires an n-th evaluation value set predicted by a designer or the like through a simulation using the n-th initial value set generated by the n-th initial value generating unit 152n. Instead of the designer or the like predicting an n-th evaluation value set using a simulation, the n-th evaluation unit 153n may predict an n-th evaluation value set by a simulation. The first time of the search is an example of "a predetermined number".

In a case that search of a second time or a subsequent time is performed, the n-th evaluation unit 153n acquires an n-th evaluation value set that has been actually measured by a designer or the like using the values of the n-th parameter set (hereinafter, referred to as an n-th search value set) searched by the n-th search unit 155n or an n-th evaluation value set predicted by the designer or the like through a simulation using the n-th search value set searched by the n-th search unit 155n. Instead of the designer or the like predicting an n-th evaluation value set using a simulation, the n-th evaluation unit 153n may predict an n-th evaluation value set by a simulation. Hereinafter, an n-th evaluation value set that is actually measured using the n-th initial value set or the n-th search value set will be referred to as an "n-th actual measured value set", and an n-th evaluation value set predicted by a simulation using the n-th initial value set or the n-th search value set will be referred to as an "n-th predicted value set" in description.

The (n+1)-th target value predicting unit 154n predicts a target value set for the (n+1)-th evaluation value set (hereinafter, referred to as an (n+1)-th target value set) based on the (n+1)-th parameter set adjusted by the (n+1)-th parameter adjusting unit 150n+1 of a later stage on the basis of at least the n-th initial value set generated by the n-th initial value generating unit 152n or the n-th search value set searched by the n-th search unit 155n. Similar to the n-th target value set, the (n+1)-th target value set may be a set of one value or a plurality of values (sample values of a function). For example, in the servo control system illustrated in FIG. 2, in a case that the (n+1)-th parameter set is set as a set of one or more parameters relating to the filter for the MA, a sample value representing a certain frequency characteristic relating to the filter for the MA may be included in the (n+1)-th target value set as a target value set.

"At least" described here, for example, means that the (n+1)-th target value set may be predicted on the basis of values of parameters adjusted in previous stages such as an (n−1)-th adjustment value set, an (n−2)-th adjustment value set, and an (n−3)-th adjustment value set in addition to the n-th initial value set. The (n−1)-th adjustment value set is a set of values of the (n−1)-th parameter set that has been adjusted by the (n−1)-th parameter adjusting unit 150*n*−1 of a stage before one stage. The (n−2)-th adjustment value set is a set of values of the (n−2)-th parameter set that has been adjusted by the (n−2)-th parameter adjusting unit 150*n*−2 of a stage before two stages. The (n−3)-th adjustment value set is a set of values of the (n−3)-th parameter set that has been adjusted by the (n−3)-th parameter adjusting unit 150*n*−3 of a stage before three stages.

In addition, the term "at least" means that, for example, the (n+1)-th target value set may be predicted on the basis of a set of values of parameters adjusted in previous stages such as the (n−1)-th adjustment value set, the (n−2)-th adjustment value set, and the (n−3)-th adjustment value set described above in addition to the n-th search value set.

For example, the (n+1)-th target value predicting unit 154*n* acquires an (n+1)-th target value set by an experiment or a simulation under specific conditions using the n-th initial value set or the n-th search value set.

In this way, the (n+1)-th target value predicting unit 154*n* predicts a target value set of the stage using the initial value set or the search value set of the n-th parameter set adjusted in the n-th stage or predicts a target value set of the (n+1)-th stage using the adjustment value set of the (n−x)-th parameter adjusted in a stage before the n-th stage in addition to the initial value set or the search values of the n-th parameter set adjusted in the n-th stage.

As described above, for example, in a case that the (n+1)-th target value set is a plurality of sample values of a function, one representative sample value may be selected from among the plurality of sample values as an (n+1)-th target value set, or a certain value may be derived from the plurality of sample values.

The n-th search unit 155*n* searches for an n-th parameter set having a highest likelihood of optimizing the (n+1)-th target value set under a predetermined restriction using all the n-th actual measured value sets or the n-th predicted value sets acquired by the n-th evaluation unit 153*n* and all the (n+1)-th target value sets predicted by the (n+1)-th target predicting unit and sets the n-th parameter set acquired through the search as the n-th search value set described above. Here, the predetermined restriction is that the n-th evaluation value set should approach the n-th target value set generated by the n-th target value generating unit 151*n*. In addition, the n-th search unit 155*n* may search for an n-th parameter set using some n-th actual measured value sets or the n-th predicted value sets and some (n+1)-th target value sets instead of searching for the n-th parameter set using all the n-th actual measured value sets or the n-th predicted value sets and all the (n+1)-th target value sets.

For example, the n-th search unit 155*n* efficiently searches for an n-th parameter set that minimizes an objective function of Equation (1) using an optimization technique.

$$obj_n(x_n) = f_{n+1}(x_n) + w_n * g_n(x_n) \quad (1)$$

In the equation, $x_n$ represents an n-th parameter set. $obj_n(x_n)$ represents an objective function when the n-th parameter set $x_n$ is set as an explanatory variable. $f_{n+1}(x_n)$ represents an (n+1)-th target value set predicted by the (n+1)-th target value predicting unit 154*n*. A product between $w_n$ and $g_n(x_n)$ represents a restriction term in the objective function $obj_n(x_n)$. $g_n(x_n)$ represents closeness between the n-th actual measured value set acquired by the n-th evaluation unit 153*n* or the n-th predicted value set predicted by the n-th evaluation unit 153*n* and the n-th target value set generated by the n-th target value generating unit 151*n* and, for example, represents a difference (error) between the n-th actual measured value set/the n-th predicted value set and the n-th target value set. $g_n(x_n)$ has a set of values that are equal to or larger than "0". $w_n$ is a weighting coefficient representing a degree in which $g_n(x_n)$ contributes to the whole objective function $obj_n(x_n)$ and has a positive value. An (n+1)-th target value $f_{n+1}(x_n)$ is an example of "a first term", and a restriction term $(w_n \times g_n(x_n))$ is an example of "a second term".

In order to minimize the objective function of Equation (1), the restriction term $(w_n \times g_n(x_n))$ needs to be small, and the (n+1)-th target value $f_{n+1}(x_n)$ needs to be small. For this reason, the n-th search unit 155*n* searches for an n-th parameter set that causes the (n+1)-th target value $f_{n+1}(x_n)$ to be small while causing the restriction term $(w_n \times g_n(x_n))$ to be small.

For example, the n-th search unit 155*n* may search for an n-th parameter set using sequential model based optimization (SMBO) that is one of optimization methods. The SMBO is called Bayesian optimization. The SMBO (Bayesian optimization) is one of methods for minimizing or maximizing an objective function (objective variable) with a smaller number of trials using an evaluation value set (the n-th actual measured value set) actually measured by experiments or the evaluation value set (the n-th predicted value set) predicted using a simulation. The n-th search unit 155*n* may search for an n-th parameter set using another optimization technique such as metaheuristics represented by a genetic algorithm (GA) or a mathematical optimization algorithm instead of or in addition to the SMBO. In the metaheuristics, for example, an evolution strategy (ES) and the like are also included. In the mathematical optimization algorithm, for example, a quasi-Newton method and the like are included.

In addition, the n-th search unit 155*n* may search for an n-th parameter set that maximizes the objective function of Equation (2) using the optimization technique represented by the SMBO and the like described above.

$$obj_n(x_n) = f_{n+1}(x_n) + (-w_n * g_n(x_n)) \quad (2)$$

[Entire Processing Flow]

Figure 4:
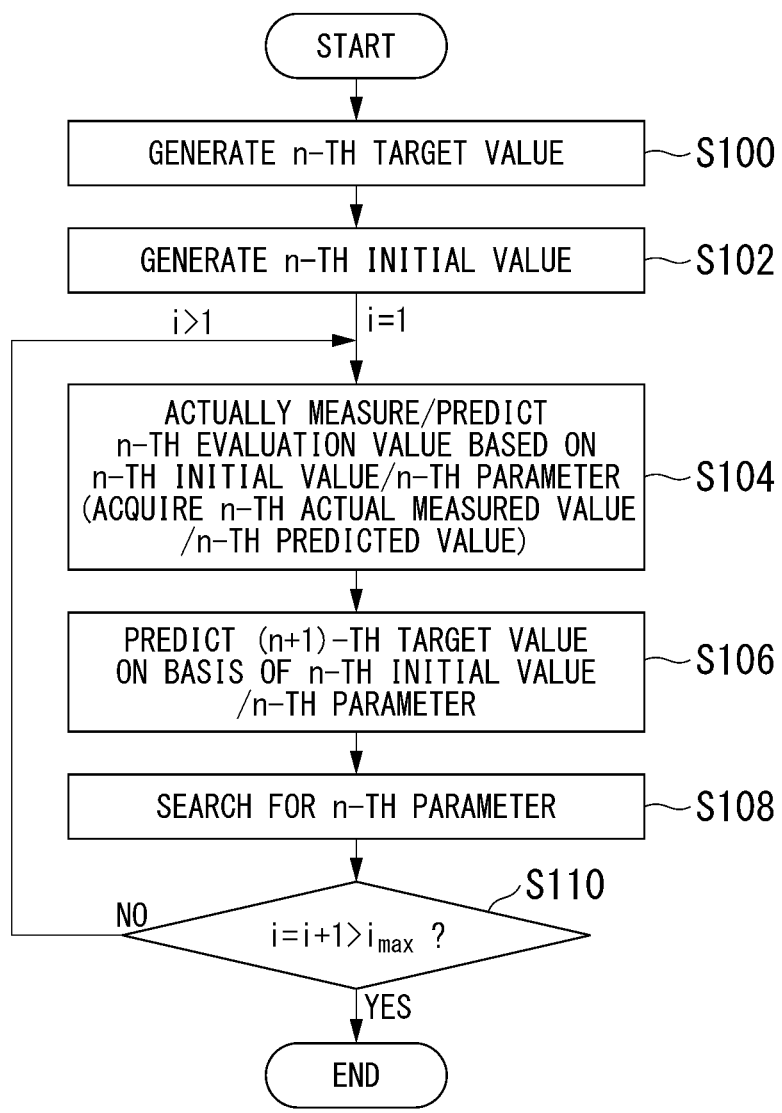
FIG. 4 is a flowchart illustrating the flow of a series of processes executed by an n-th parameter adjusting unit according to an embodiment.

Hereinafter, the flow of the process of the information processing apparatus 100 will be described on the basis of a flowchart. FIG. 4 is a flowchart illustrating the flow of a series of processes executed by the n-th parameter adjusting unit 150*n* according to the embodiment.

First, the n-th target value generating unit 151*n* generates an n-th target value set that is a target value set for an evaluation value set based on the n-th parameter set adjusted in the current stage on the basis of at least the (n−1)-th parameter set adjusted by the (n−1)-th parameter adjusting unit 150*n*−1 of the previous stage (Step S100).

Next, the n-th initial value generating unit 152*n* generates an n-th initial value set that is a set of one or more initial values of the n-th parameter set using a random number or the like (Step S102).

Next, the n-th evaluation unit 153*n* acquires an n-th evaluation value set (in other words, an n-th actual measured value set or an n-th predicted value set) that has been actually measured or predicted using the n-th initial value set generated by the n-th initial value generating unit 152*n* (Step S104).

For example, in a case that a designer actually measures an n-th evaluation value set by experiments or predicts an n-th evaluation value set by a simulation, the n-th evaluation unit 153*n* instructs the output control unit 140 to transmit information relating to the n-th initial value set to a computer of the designer. The information relating to the n-th initial value set may be the n-th initial values, a graph that visually displays the n-th initial values, or the like. The output control unit 140 that has received the instruction transmits the information relating to the n-th initial value set to the computer of the designer through the communication unit 110. In a display of the computer, the n-th initial value set is displayed, or a graph that visually draws the n-th initial value set or the like is displayed. The designer actually measures a set of one or more evaluation values based on the n-th parameter value set by an actual device of the control system or predicts a set of one or more evaluation values based on the n-th parameter value set by a simulation on the computer while viewing values, a graph, or the like displayed on the display of the computer. Then, the designer inputs a result of the actual measurement or a result of the simulation of the n-th evaluation values to the computer. When a result of the actual measurement or a result of the simulation of the n-th evaluation value set is input, the computer transmits the results to the information processing apparatus 100 through the network NW. Then, the n-th evaluation unit 153*n* acquires the result of the actual measurement of the n-th evaluation value set as an n-th actual measured value set or the result of the simulation of the n-th evaluation value set as an n-th predicted value set from the computer of the designer through the communication unit 110. In addition, in a case that a user interface such as a keyboard or a touch panel is connected to the information processing apparatus 100, and the designer directly inputs an actual measurement result or a simulation result by operating such a user interface, the n-th evaluation unit 153*n* may acquire the actual measurement result or the simulation result through the user interface.

In addition, the n-th evaluation unit 153*n* may predict an n-th evaluation value set by a simulation instead of or in addition to causing the designer to actually measure or predict the n-th evaluation value set by transmitting the information relating to the n-th initial value set to the computer of the designer. In other words, the n-th evaluation unit 153*n* may cause the process to non-interactively proceed instead of or in addition to the causing of the process to interactively proceed. In this way, an n-th actual measured value set that is an actually-measured value set of the n-th evaluation value set or an n-th predicted value set that is a predicted value set of the n-th evaluation value set can be acquired.

Next, the (n+1)-th target value predicting unit 154*n* predicts an (n+1)-th target value set that is a target value set of the (n+1)-th stage on the basis of at least the n-th initial value set generated by the n-th initial value generating unit 152*n* (Step S106). The process of S106 may be performed before the process of S104 or may be performed in parallel with the process of S104.

Next, the n-th search unit 155*n* searches for an n-th parameter set having a high likelihood of optimizing the (n+1)-th target value set under a predetermined restriction using all the n-th actual measured value sets or the n-th predicted value sets acquired by the n-th evaluation unit 153*n* and all the (n+1)-th target value sets predicted by the (n+1)-th target value predicting unit 154*n* (Step S108). As described above, the predetermined restriction is that the n-th evaluation value set should approach the n-th target value set generated by the n-th target value generating unit 151*n*. As described above, the n-th search unit 155*n* may search for an n-th parameter set under a predetermined restriction using some of the n-th actual measured value sets or the n-th predicted value sets and some of the (n+1)-th target value sets.

Next, the n-th search unit 155*n*, when the number of times i of iteration of the current search is incremented, determines whether or not the number of times i is smaller than a maximum number of times imax (Step S110). In a case that the number of times i of iteration that has been incremented is larger than the maximum number of times imax (i=i+1>imax), the n-th search unit 155*n* ends the process of this flowchart.

On the other hand, in a case that the number of times i of iteration that has been incremented is equal to or smaller than the maximum number of times imax (i=i+1≤imax), the n-th search unit 155*n* returns the process of S104.

Then, the n-th evaluation unit 153*n* acquires an n-th evaluation value set (in other words, an n-th actual measured value set or an n-th predicted value set) that has been actually measured or predicted by the designer using the n-th search value set searched by the n-th search unit 155*n* as the process of S104 For example, the n-th evaluation unit 153*n* causes the designer to actually measure or predict the n-th evaluation value set by transmitting the information relating to the n-th search value set to the computer of the designer. In addition, the n-th evaluation unit 153*n* may predict an n-th evaluation value set using the n-th search value set searched by the n-th search unit 155*n*.

Next, the (n+1)-th target value predicting unit 154*n* predicts an (n+1)-th target value set that is a set of target values of the (n+1)-th stage on the basis of at least the n-th search value set searched by the n-th search unit 155*n* as the process of S106.

Next, the n-th search unit 155*n* searches for an n-th parameter set having a high likelihood of optimizing the (n+1)-th target value set under a predetermined restriction using all the n-th actual measured value sets or the n-th predicted value sets acquired by the n-th evaluation unit 153*n* and all the (n+1)-th target value sets predicted by the (n+1)-th target value predicting unit 154*n* as the process of S108. In this way, the information processing apparatus 100 repeats searching for an n-th parameter set optimizing the predicted (n+1)-th target value set under a predetermined restriction until the number of times i of iteration of the search becomes larger than the maximum number of times imax. As described above, the n-th search unit 155*n* may repeat the searching for an n-th parameter set under a predetermined restriction using some of the n-th actual measured value sets or the n-th predicted value sets and some of the (n+1)-th target value sets.

In addition, in the flowchart described above, although it has been described that the n-th parameter adjusting unit 150*n* may acquire an n-th evaluation value set (an n-th actual measured value set or an n-th predicted value set) from an external device (for example, the computer of the designer) as the process of S104, the configuration is not limited thereto. For example, the n-th parameter adjusting unit 150*n* may acquire an n-th target value set from an external device as the process of S100 or may acquire an n-th initial value set from an external device as the process of S102. In addition, the n-th parameter adjusting unit 150$n$ may acquire an (n+1)-th target value set from an external device as the process of S106.

[Processing Flow of Parameter Searching]

Figure 5:
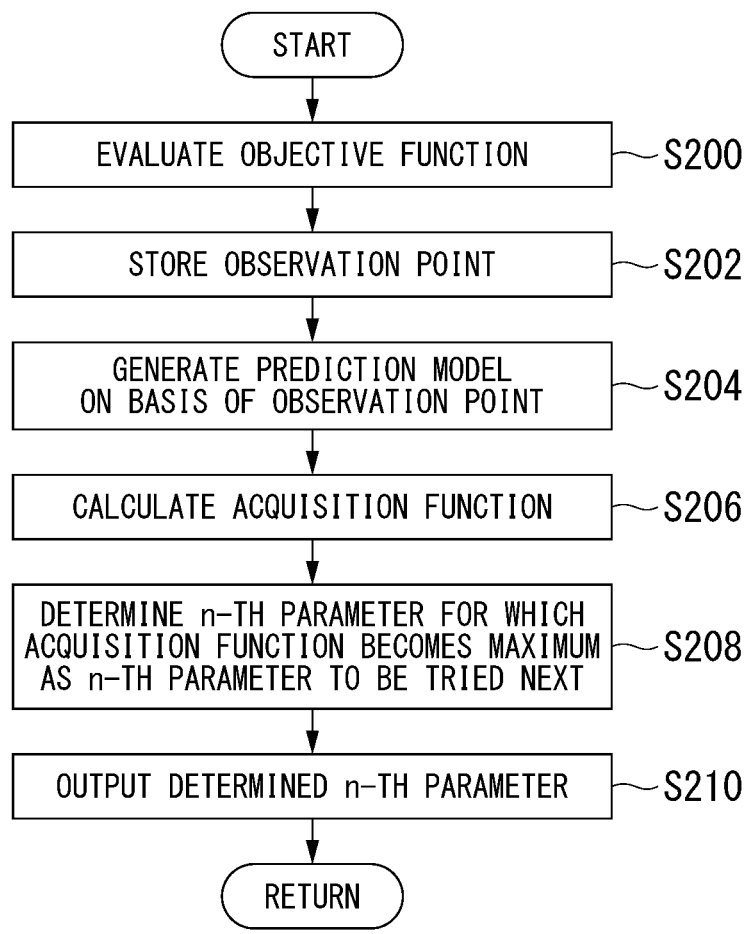
FIG. 5 is a flowchart illustrating the flow of a parameter searching process executed by an information processing apparatus according to an embodiment.

Hereinafter, the flow of a parameter searching process will be described with reference to a flowchart. FIG. 5 is a flowchart illustrating the flow of the parameter searching process executed by the information processing apparatus 100 according to the embodiment. The process of this flowchart corresponds to the process of S108 in a case that the SMBO (Bayesian optimization) is employed as an optimization technique.

First, in a case that search of a first time is performed, the n-th search unit 155$n$ evaluates an objective function on the basis of an n-th actual measured value set or an n-th predicted value set acquired using the n-th initial value set and an (n+1)-th target value set acquired using the n-th initial value set (Step S200).

For example, in the case of the objective function represented in Equation (1), the n-th search unit 155$n$ acquires a restriction term $(w_n \times g_n(x_n))$ using the n-th target value set and the n-th actual measured value set or the n-th predicted value set based on a certain n-th parameter set $x_n$ and further derives a sum of the restriction term $(w_n \times g_n(x_n))$ and the (n+1)-th target value $(f_{n+1}(x_n))$ based on the n-th parameter set $x_n$ described above as an objective function $obj_n(x_n)$.

Next, the n-th search unit 155$n$ stores data having the n-th parameter set $x_n$ (the n-th initial value set or the n-th search value set) and the value set (in other words, objective variables) of the derived objective function $obj_n(x_n)$ as a set in the storage unit 160 (Step S202). Hereinafter, data having the n-th parameter set $x_n$ (the n-th initial value set or the n-th search value set) and the value set of the objective function $obj_n(x_n)$ as a set will be referred to as an "observation point" in the description.

Next, the n-th search unit 155$n$ generates a prediction model that represents an objective function on the basis of all the observation points stored in the storage unit 160 (Step S204). The prediction model, for example, may be a regression model of a Gaussian process. The regression of the Gaussian process is one of non-parametric regression method and is a technique enabling estimation of an average value and a variance of objective variables at an unknown point.

Next, the n-th search unit 155$n$ calculates an acquisition function using the prediction model of the objective function generated in the process of S204 (Step S206).

The acquisition function is a function that is used for selecting a next parameter set having a high likelihood of being an optimal parameter set. There are several types of acquisition function and, for example, there is expected improvement (EI). The EI is a function having an expected value set of a difference between an evaluation value set of the prediction model and a best value set at an evaluation time point (an expected value set of an amount of improvement) as an objective variable. As examples of the acquisition function, there are probability of improvement (PI), confidence band (CB), mutual information (MI), and the like. Here, as an example, the acquisition function will be described as the EI.

Next, the n-th search unit 155$n$ determines the n-th parameter set for which the acquisition function EI becomes a maximum as an n-th parameter set $x_n$ (in other words, the n-th search value set) to be tried next for acquiring a new observation point (the value of $obj_n(x_n)$ based on the n-th actual measured value set/the n-th predicted value set and the (n+1)-th target value set) (Step S208). In other words, the n-th search unit 155$n$ determines an n-th parameter set for which the improvement can be expected the most as an n-th parameter set $x_n$ to be tried next for acquiring a new observation point.

Next, the n-th search unit 155$n$ outputs information relating to the determined n-th parameter set $x_n$ as information relating to the n-th search value set described above (Step S210). In this way, the process of this flowchart ends.

[Comparison Between Technology of this Embodiment and Related Technology]

Figure 6:
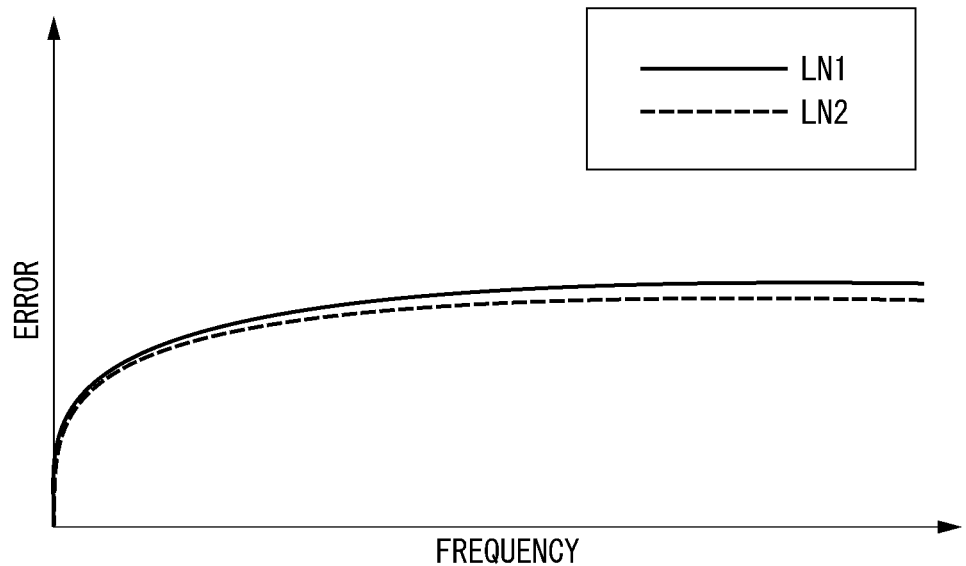
FIG. 6 is a diagram illustrating a result of adjustment of an n-th parameter set using the related art.
Figure 7:
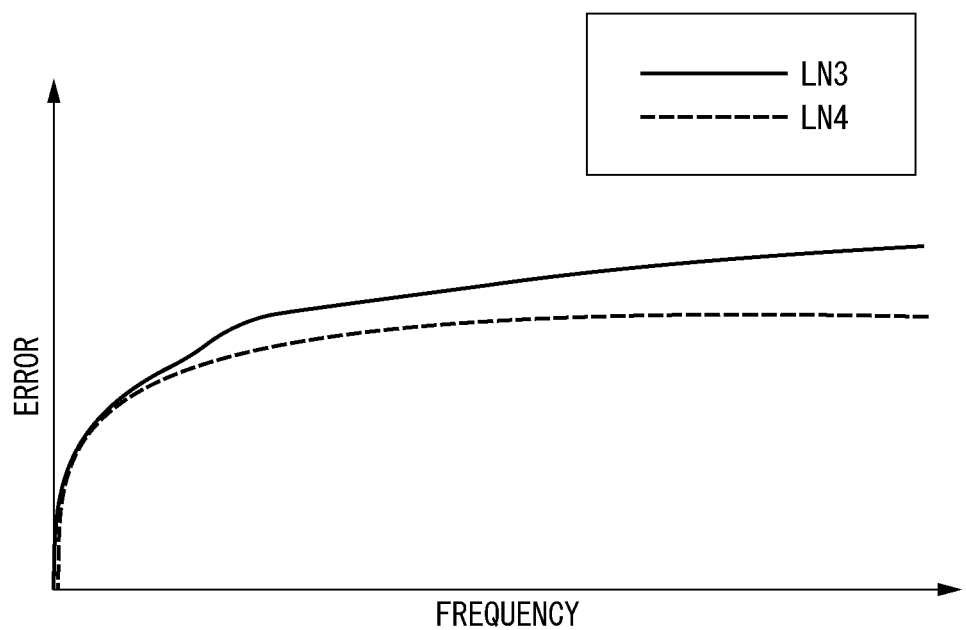
FIG. 7 is a diagram illustrating a result of adjustment of an (n+1)-th parameter set using the related art.
Figure 8:
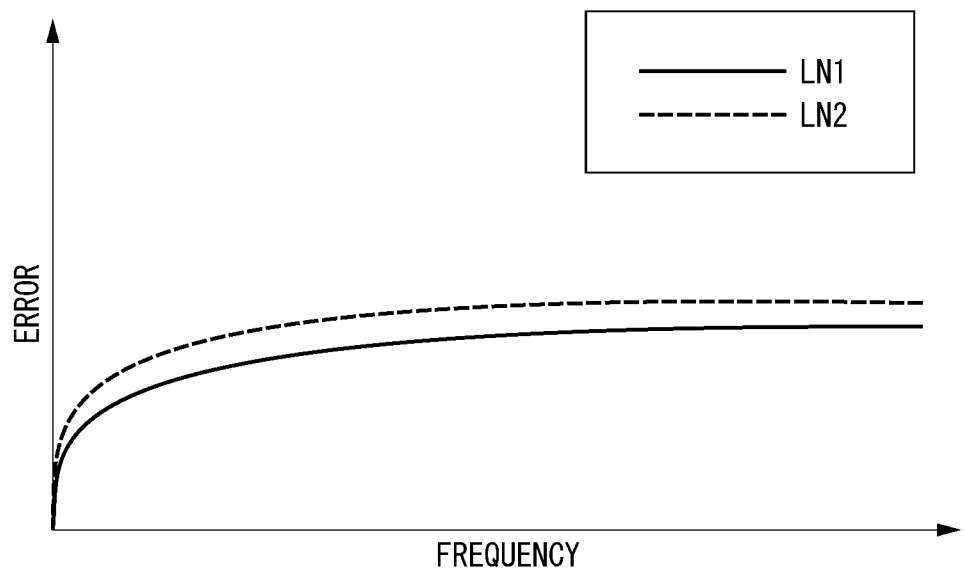
FIG. 8 is a diagram illustrating a result of adjustment of an n-th parameter set using a technology according to an embodiment.
Figure 9:
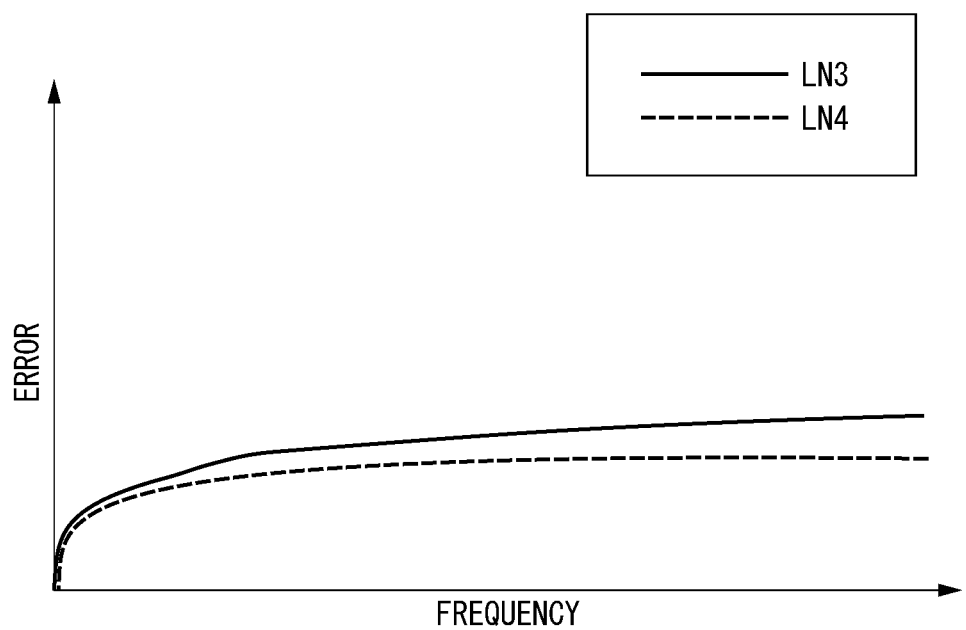
FIG. 9 is a diagram illustrating a result of adjustment of an (n+1)-th parameter set using a technology according to an embodiment.

FIG. 6 is a diagram illustrating a result of adjustment of an n-th parameter set using related technologies. FIG. 7 is a diagram illustrating a result of adjustment of an (n+1)-th parameter set using related technologies. FIG. 8 is a diagram illustrating a result of adjustment of an n-th parameter set using the technology of the embodiment (present technology). FIG. 9 is a diagram illustrating a result of adjustment of an (n+1)-th parameter set using the technology of the embodiment (present technology). The drawings illustrate frequency characteristics of error. In the drawing, LN1 represents evaluation value set of the n-th parameter set adjusted in the n-th stage. LN2 represents an n-th target value set for an evaluation value set of the n-th parameter set in the n-th stage. LN3 represents evaluation value set of the (n+1)-th parameter set adjusted in the (n+1)-th stage. LN4 represents an (n+1)-th target value set for an evaluation value of the (n+1)-th parameter set in the (n+1)-th stage.

As illustrated in the drawings, according to the technology of this embodiment, the (n+1)-th target value set in the (n+1)-th stage is different from that of the related technologies. In this way, according to the technology of this embodiment, like the objective function described above, for example, by minimizing the (n+1)-th target value set of the (n+1)-th stage, which is a later stage, in the n-th stage, the (n+1)-th target value set can be lowered than that of the related technologies. In the (n+1)-th stage, since the (n+1)-th target value set is lower than that of the related technologies, the (n+1)-th parameter set is adjusted so that the evaluation value set becomes closer to the (n+1)-th target value set that has been lowered. As a result, the technology of this embodiment can decrease error to be smaller than that of the related technologies.

According to at least one embodiment described above, the information processing apparatus 100, in a case that search of a first time is performed, generates an n-th initial value set that are initial values of at least one set or more of n-th parameters, acquires an n-th actual measured value set or an n-th predicted value set based on each of the generated n-th initial values, predicts an (n+1)-th target value set that is a target value set of the (n+1)-th actual measured value set or the (n+1)-th predicted value set dependent from each other with the n-th parameter set on the basis of each of the generated n-th initial value sets, and searches for an n-th parameter set that optimizes the (n+1)-th target value set under a restriction that the n-th evaluation value set should approach the n-th target value set using the n-th actual measured value set or the n-th predicted value set that has been acquired and the (n+1)-th target value set that has been predicted. The information processing apparatus 100, in a case that search of a second time or a subsequent time is performed, acquires the n-th actual measured value set or an n-th predicted value set on the basis of the n-th search value set that is the n-th parameter set acquired through searching of the previous time, predicts an (n+1)-th target value set on the basis of the n-th search value set, and repeats searching for the n-th parameter set that optimizes the (n+1)-th target value set under a restriction that the n-th evaluation value set should approaches the n-th target value set using the n-th actual measured value set or the n-th predicted value set that has been acquired and the (n+1)-th target value set that has been predicted. In this way, parameters, which require a time in adjustment or are difficult to adjust for a person, can be automatically optimized using machine learning.

[Another Expression Example]

An information processing apparatus including at least one memory storing a program and at least one processor, the processor, by executing the program, being configured to adjust an n-th parameter set so that an n-th evaluation value set based on at least the n-th parameter set among a plurality of parameters dependent from each other approaches an n-th target value set and adjust an (n+1)-th parameter set so that an (n+1)-th evaluation value set based on at least the (n+1)-th parameter set among the plurality of parameters approaches an (n+1)-th target value set, in a case that the number of times of searching for the n-th parameter set is equal to or smaller than a predetermined number, acquire at least one or more sets of initial values of the n-th parameter set, acquire, based on each of the acquired one or more sets of initial values, an n-th actual measured value set that is an actually-measured value set of the n-th evaluation value set or an n-th predicted value set that is a predicted value set of the n-th evaluation value set, acquire the (n+1)-th target value set based on each of the acquired one or more sets of initial values, and search for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set and, in a case that the number of times of searching for the n-th parameter set exceeds the predetermined number, acquire, based on the searched n-th parameter set, an n-th actual measured value set that is an actually-measured value set of the n-th evaluation value set or an n-th predicted value set that is a predicted value set of the n-th evaluation value set, acquire the (n+1)-th target value set based on the searched n-th parameter set, and search for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set.

While several embodiments of the present invention have been described, such embodiments are presented as examples but are not intended to limit the scope of the present invention. These embodiments may be performed in other various forms, and various omissions, substitutions, and changes may be performed in a range not departing from the concept of the present invention therein. These embodiments and the modifications thereof, similar to a case where these are included in the scope or the concept of the invention, are included in inventions described in the claims and equivalent ranges thereof.

What is claimed is:

1. An information processing apparatus comprising:
    an n-th parameter adjuster configured to adjust an n-th parameter set so that an n-th evaluation value set based on at least the n-th parameter set among a plurality of parameters dependent from each other approaches an n-th target value set; and
    an (n+1)-th parameter adjuster configured to adjust an (n+1)-th parameter set so that an (n+1)-th evaluation value set based on at least the (n+1)-th parameter set among the plurality of parameters approaches an (n+1)-th target value set,
    wherein the n-th parameter adjuster is configured to, in a case that a number of times of searching for the n-th parameter set is equal to or smaller than a predetermined number, acquire at least one or more sets of initial values of the n-th parameter set, acquire, based on each of the acquired one or more sets of initial values, an n-th actual measured value set that is an actually-measured value set of the n-th evaluation value set or an n-th predicted value set that is a predicted value set of the n-th evaluation value set, acquire the (n+1)-th target value set based on each of the acquired one or more sets of initial values, and search for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set, and
    wherein the n-th parameter adjuster is configured to, in a case that the number of times of searching for the n-th parameter set exceeds the predetermined number, acquire, based on the searched n-th parameter set, an n-th actual measured value set that is an actually-measured value set of the n-th evaluation value set or an n-th predicted value set that is a predicted value set of the n-th evaluation value set, acquire the (n+1)-th target value set based on the searched n-th parameter set, and search for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set, wherein
    the apparatus comprises a plurality of parameter adjusters arranged in series including the n-th and (n+1)th parameter adjusters, and
    the (n+1)-th parameter adjuster adjusts the (n+1)-th parameter set using at least the n-th parameter set adjusted by the n-th parameter adjuster.

2. The information processing apparatus according to claim 1, wherein each of the n-th target value set and the (n+1)-th target value set comprises one or more sets of target values.

3. The information processing apparatus according to claim 1, wherein the n-th parameter adjuster is configured to search for the n-th parameter set by a sequential model based optimization.

4. The information processing apparatus according to claim 1, wherein the n-th parameter adjuster is configured to search for the n-th parameter set on the basis of an objective function having the (n+1)-th target value set as a first term and having an index value set, as a second term, representing closeness between the n-th actual measured value set or the n-th predicted value set and the n-th target value set.

5. The information processing apparatus according to claim 1,
    wherein the plurality of parameters are parameters relating to design of a hard disk drive,
    wherein the n-th parameter set is a set of parameters of a first filter that suppresses a first external disturbance of the hard disk drive, and
    wherein the (n+1)-th parameter set is another set of parameters of a second filter that suppresses a second external disturbance of the hard disk drive.

6. The information processing apparatus according to claim 1, wherein the (n+1)-th parameter adjuster is configured to adjust the (n+1)-th parameter set after the n-th parameter set is adjusted by the n-th parameter adjuster.

7. The information processing apparatus according to claim 1, wherein the predetermined number is one.

8. The information processing apparatus according to claim 1, wherein the apparatus comprises a first parameter adjuster in the plurality of parameter adjusters arranged in series, and each subsequent parameter adjuster adjusts a parameter set using at least the a parameter set adjusted by a preceding parameter adjuster.

9. An information processing method using a computer, the information processing method comprising:
   adjusting an n-th parameter set so that an n-th evaluation value set based on at least the n-th parameter set among a plurality of parameters dependent from each other approaches an n-th target value set;
   adjusting an (n+1)-th parameter set so that an (n+1)-th evaluation value set based on at least the (n+1)-th parameter set among the plurality of parameters approaches an (n+1)-th target value set;
   in a case that a number of times of searching for the n-th parameter set is equal to or smaller than a predetermined number, acquiring at least one or more sets of initial values of the n-th parameter set, acquiring, based on each of the acquired one or more sets of initial values, an n-th actual measured value set that is an actually-measured value set of the n-th evaluation value set or an n-th predicted value set that is a predicted value set of the n-th evaluation value set, acquiring the (n+1)-th target value set based on each of the acquired one or more sets of initial values, searching for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set; and
   in a case that the number of times of searching for the n-th parameter set exceeds the predetermined number, acquiring, based on the searched n-th parameter set, an n-th actual measured value set that is an actually-measured value set of the n-th evaluation value set or an n-th predicted value set that is a predicted value set of the n-th evaluation value set, acquiring the (n+1)-th target value set based on the searched n-th parameter set, and searching for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set, wherein
   adjusting the n-th parameter set and the (n+1)th parameter set is performed in series, and
   adjusting the (n+1)-th parameter set comprises using at least the n-th parameter set produced in adjusting the n-th parameter set.

10. The information processing method according to claim 9, comprising adjusting a plurality of parameter sets in series including a first in the series of adjusting the parameter sets, wherein each adjusting of parameter sets other than the first in the series adjusts a parameter set using at least the parameter set adjusted in a preceding adjusting of a parameter set in the series.

11. An information processing apparatus comprising:
   an n-th parameter adjuster configured to adjust an n-th parameter set so that an n-th evaluation value set based on at least the n-th parameter set among a plurality of parameters dependent from each other approaches an n-th target value set; and
   an (n+1)-th parameter adjuster configured to adjust an (n+1)-th parameter set so that an (n+1)-th evaluation value set based on at least the (n+1)-th parameter set among the plurality of parameters approaches an (n+1)-th target value set,
   wherein the n-th parameter adjuster is configured to, in a case that a number of times of searching for the n-th parameter set is equal to or smaller than a predetermined number, acquire at least one or more sets of initial values of the n-th parameter set, acquire, based on each of the acquired one or more sets of initial values, an n-th actual measured value set that is an actually-measured value set of the n-th evaluation value set or an n-th predicted value set that is a predicted value set of the n-th evaluation value set, acquire the (n+1)-th target value set based on each of the acquired one or more sets of initial values, and search for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set,
   wherein the n-th parameter adjuster is configured to, in a case that the number of times of searching for the n-th parameter set exceeds the predetermined number, acquire, based on the searched n-th parameter set, an n-th actual measured value set that is an actually-measured value set of the n-th evaluation value set or an n-th predicted value set that is a predicted value set of the n-th evaluation value set, acquire the (n+1)-th target value set based on the searched n-th parameter set, and search for the n-th parameter set that optimizes the (n+1)-th target value set under a restriction that the n-th evaluation value set approaches the n-th target value set using the acquired n-th actual measured value set or the n-th predicted value set and the acquired (n+1)-th target value set,
   wherein the plurality of parameters are parameters relating to design of a hard disk drive,
   wherein the n-th parameter set is a set of parameters of a first filter that suppresses a first external disturbance of the hard disk drive, and
   wherein the (n+1)-th parameter set is another set of parameters of a second filter that suppresses a second external disturbance of the hard disk drive.

* * * * *